United States Patent
Choi et al.

(10) Patent No.: US 9,524,557 B2
(45) Date of Patent: Dec. 20, 2016

(54) VEHICLE DETECTING METHOD AND SYSTEM

(71) Applicants: Hyundai Motor Company, Seoul (KR); Kia Motors Corporation, Seoul (KR); Industry-Academic Cooperation Foundation, Yonsei University, Seoul (KR)

(72) Inventors: Jin Ha Choi, Suwon-Gyeonggi-Do (KR); Dae Hwan Kim, Suwon-Gyeonggi-Do (KR); Jae Sung Kim, Anyang-Gyeonggi-Do (KR); Kyung Jae Lee, Seoul (KR); Jin Kyu Hwang, Gyeonggi-Do (KR); Sang Youn Lee, Seoul (KR)

(73) Assignees: Hyundai Motor Company, Seoul (KR); Kia Motors Company, Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 159 days.

(21) Appl. No.: 14/537,331

(22) Filed: Nov. 10, 2014

(65) Prior Publication Data
US 2015/0178911 A1 Jun. 25, 2015

(30) Foreign Application Priority Data

Dec. 24, 2013 (KR) ........................ 10-2013-0162431

(51) Int. Cl.
*G06K 9/00* (2006.01)
*G06T 7/00* (2006.01)

(52) U.S. Cl.
CPC ........... *G06T 7/0075* (2013.01); *G06T 7/0042* (2013.01); *G06T 2200/04* (2013.01);
(Continued)

(58) Field of Classification Search
CPC ............ G06K 9/00798; G06K 9/00805; G06K 9/00201; G06K 9/00791; G06T 2207/10028; G06T 2207/30256; G06T 2207/30261; G06T 7/0046; G06T 7/0075; G06T 7/60; G06T 2207/30252
See application file for complete search history.

(56) References Cited

U.S. PATENT DOCUMENTS

| 2005/0232463 A1* | 10/2005 | Hirvonen ........... G06K 9/00805 382/103 |
| 2013/0128001 A1* | 5/2013 | You ................... G06K 9/00208 348/47 |

(Continued)

FOREIGN PATENT DOCUMENTS

| JP | H10-143659 A | 5/1998 |
| JP | 2005-045338 A | 2/2005 |

(Continued)

OTHER PUBLICATIONS

Vatavu, Andrei, Sergiu Nedevschi, and Florin Oniga. "Real-time environment representation based on occupancy grid temporal analysis using a dense stereo-vision system." Intelligent Computer Communication and Processing (ICCP), 2010 IEEE International Conference on. IEEE, 2010.*

(Continued)

*Primary Examiner* — Stephen R Koziol
*Assistant Examiner* — Jonathan S Lee
(74) *Attorney, Agent, or Firm* — Mintz Levin Cohn Ferris Glovsky and Popeo, P.C.; Peter F. Corless

(57) ABSTRACT

A vehicle detecting system and method are provided. The method includes creating, by a controller, a disparity map using images photographed by a stereoscopic imaging device and detecting a road area on the disparity map. In
(Continued)

addition, the controller is configured to detect a vehicle present in the road area in a shape of a stereoscopic object.

17 Claims, 12 Drawing Sheets

(52) U.S. Cl.
CPC ............... *G06T 2207/10021* (2013.01); *G06T 2207/30256* (2013.01); *G06T 2207/30261* (2013.01)

(56) References Cited

U.S. PATENT DOCUMENTS

| | | | |
|---|---|---|---|
| 2013/0148856 A1* | 6/2013 | Lu ..................... | G06K 9/00798 382/104 |
| 2013/0163821 A1* | 6/2013 | You ................... | G06K 9/00208 382/104 |
| 2014/0086451 A1* | 3/2014 | Liu .................... | G06K 9/00798 382/103 |
| 2014/0086477 A1* | 3/2014 | You ..................... | B60W 40/06 382/154 |
| 2014/0159925 A1* | 6/2014 | Mimeault ............... | G01S 17/58 340/935 |
| 2015/0036887 A1* | 2/2015 | Allezard ............... | G06T 7/0046 382/106 |
| 2015/0227800 A1* | 8/2015 | Takemae ............... | G06T 7/0081 382/104 |

FOREIGN PATENT DOCUMENTS

| | | |
|---|---|---|
| JP | 2007-263669 A | 10/2007 |
| JP | 2009-086882 A | 4/2009 |
| JP | 2013-113600 A | 6/2013 |
| JP | 2013-134780 A | 7/2013 |
| KR | 10-0915880 | 9/2009 |
| KR | 10-1163042 | 7/2012 |
| KR | 10-1243108 | 3/2013 |
| KR | 10-1289386 | 7/2013 |
| WO | 2008/053649 A1 | 5/2008 |

OTHER PUBLICATIONS

Labayrade, Raphael, Didier Aubert, and Jean-Philippe Tarel. "Real time obstacle detection in stereovision on non flat road geometry through "v-disparity" representation." Intelligent Vehicle Symposium, 2002. IEEE. vol. 2. IEEE, 2002.*
Oniga, Florin, Ervin Sarkozi, and Sergiu Nedevschi. "Fast obstacle detection using U-disparity maps with stereo vision." Intelligent Computer Communication and Processing (ICCP), 2015 IEEE International Conference on. IEEE, 2015.*
Ai, X., et al. "Obstacle detection using U-disparity on quadratic road surfaces." 16th International IEEE Conference on Intelligent Transportation Systems (ITSC 2013). IEEE, 2013.*
Pantilie, Cosmin D., and Sergiu Nedevschi. "Real-time obstacle detection in complex scenarios using dense stereo vision and optical flow." Intelligent Transportation Systems (ITSC), 2010 13th International IEEE Conference on. IEEE, 2010.*
Nguyen, Vinh Dinh, et al. "A fast evolutionary algorithm for real-time vehicle detection." IEEE Transactions on Vehicular Technology 62.6 (2013): 2453-2468.*
Gao, Yuan, et al. "UV-disparity based obstacle detection with 3D camera and steerable filter." Intelligent Vehicles Symposium (IV), 2011 IEEE. IEEE, 2011.*
Oniga, Florin, and Sergiu Nedevschi. "Processing dense stereo data using elevation maps: Road surface, traffic isle, and obstacle detection." IEEE Transactions on Vehicular Technology 59.3 (2010): 1172-1182.*
Lee, Chung-Hee et al., "Accurate Obstacle Detection Method Using Disparity Map and Intensity Information", IEEK Summer Conference 2012, Division of IT-Convergence, Daegu Gyeongbuk Institute of Science & Technology, Vo.. 35, No. 1, 2012, pp. 1242-1244.

* cited by examiner

VEHICLE DETECTING METHOD AND SYSTEM

CROSS-REFERENCE TO RELATED APPLICATION

This application is based on and claims the benefit of priority to Korean Patent Application No. 10-2013-0162431, filed on Dec. 24, 2013 in the Korean Intellectual Property Office, the disclosure of which is incorporated herein in its entirety by reference.

TECHNICAL FIELD

The present disclosure relates to a vehicle detecting system and method of detecting other vehicles positioned in the vicinity of a vehicle being driven and continuously tracking the detected vehicles.

BACKGROUND

A method of detecting an obstacle in the vicinity of a vehicle using an image obtained by photographing the vicinity of the vehicle has been studied. A monoscopic image or a stereoscopic image may be used to detect the obstacle in the vicinity of the vehicle. When using the monoscopic image, a separation degree between the obstacle and a background is substantially low thus deteriorating detection performance. Therefore, a detecting method using the stereoscopic image has been mainly used. Detection performance may be improved when using the stereoscopic image compared with using the monoscopic image. However, since a depth value is used for the stereoscopic image a data throughput increases.

SUMMARY

The present invention provides a vehicle detecting system and method that may decrease a data throughput when detecting an obstacle in the vicinity of a vehicle using a stereoscopic image and may more accurately detect a position of the vehicle. In addition, present invention provides a vehicle detecting system and method that may more accurately track a detected vehicle.

According to an exemplary embodiment of the present disclosure, a vehicle detecting method may include: creating a disparity map using images photographed by a stereoscopic imaging device (e.g., camera, video camera, etc.); detecting a road area on the disparity map; and detecting a vehicle present in the road area in a shape of a stereoscopic object. The detection of the road area may include: creating a v-disparity map using the disparity map; detecting a road component having a substantially straight line form in the v-disparity map; and detecting the road area in the disparity map using the road component. In addition, in the detection of the road component, a plurality of road components may be detected in the v-disparity map.

The detection of the vehicle may include: creating a virtual three-dimensional structure having a preset shape on the disparity map; deforming the three-dimensional structure to cause a bottom surface of the three-dimensional structure to coincide with the road area; and detecting the vehicle present in the deformed three-dimensional structure in the shape of the stereoscopic object. The detection of the vehicle present in the modified three-dimensional structure in the shape of the stereoscopic object may include: converting the disparity map into a top view image; detecting a vehicle area having a rectangular shape in the top view image; converting the top view image into a disparity map; and detecting a height of the vehicle area using the disparity map.

In the conversion of the disparity map into the top view image, an area included in the three-dimensional structure may be converted into the top view image. In addition, in the detection of the vehicle area, obstacles having a height equal to or greater than a preset height among obstacles present in the top view image may be detected as the vehicle area. In the detection of the vehicle area, the vehicle area may be detected based on the number of pixels occupied by the vehicle depending on a distance from an imaging device to the vehicle.

The vehicle detecting method may further include: creating a virtual stereoscopic object that corresponds to the vehicle in the image photographed by the stereoscopic imaging device; detecting feature points in an area of the stereoscopic object; creating a motion vector by comparing the feature points with feature points detected in an image temporally continuous to the image; and moving a position of the stereoscopic object based on the motion vector.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present disclosure will be described in detail with reference to the accompanying drawings.

Figure 1:
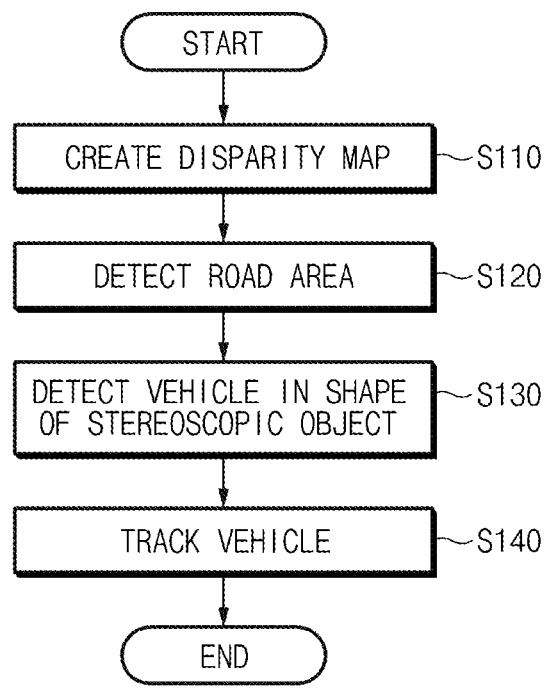
FIG. 1 is an exemplary diagram illustrating a vehicle detecting method according to an exemplary embodiment of the present disclosure.

FIG. 1 is an exemplary diagram illustrating a vehicle detecting method according to an exemplary embodiment of the present disclosure. A vehicle tracking method according to an exemplary embodiment of the present invention may be implemented by a program code and be operated by a processor such as a micro control unit (MCU), an electronic control unit (ECU), or the like, mounted within a vehicle. Referring to FIG. 1, first, a disparity map may be created (S110). An image for creating the disparity map may be photographed by a stereoscopic imaging device (e.g., camera, video camera, or the like). The stereoscopic imaging device may be configured to simultaneously photograph (e.g., capture) a plurality of images using a plurality of photographing lenses. The plurality of stereoscopic images photographed by the stereoscopic imaging device may have a disparity due to a difference between viewing points of the photographing lenses.

A distance of to object from the vehicle being driven may be recognized by the disparity between the plurality of images photographed by the stereoscopic imaging device. Although there are several methods of creating the disparity map, the disparity map may generally display distance information by a disparity between two images based on brightness. In particular, a substantially close object (e.g., within a predetermined distance from the vehicle being driven) may be displayed by a bright value, and a substantially distant object (e.g., beyond a predetermined distance from the vehicle being driven) may be displayed by a dark value (e.g., a value darker than the bright value). When the disparity map is created, a road area may be detected on the disparity map (S120). A process of detecting a road area on a disparity map will be described in detail with reference to FIGS. 2 to 5B.

Figure 2:
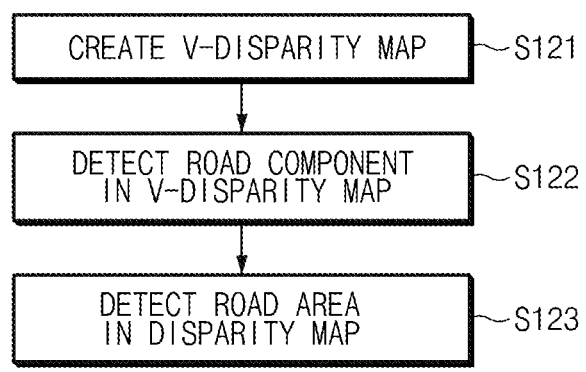
FIG. 2 is an exemplary flow chart illustrating a process of detecting a road area on a disparity map according to an exemplary embodiment of the present disclosure.

FIG. 2 is an exemplary flow chart illustrating a process of detecting a road area on a disparity map according to an exemplary embodiment of the present disclosure. Referring to FIG. 2, a v-disparity map may be first created using the disparity map (S121). The v-disparity map may be created by accumulating pixels having a disparity in the disparity map. This will be described with reference to FIGS. 3A and 3B.

Figures 3A, 3B:
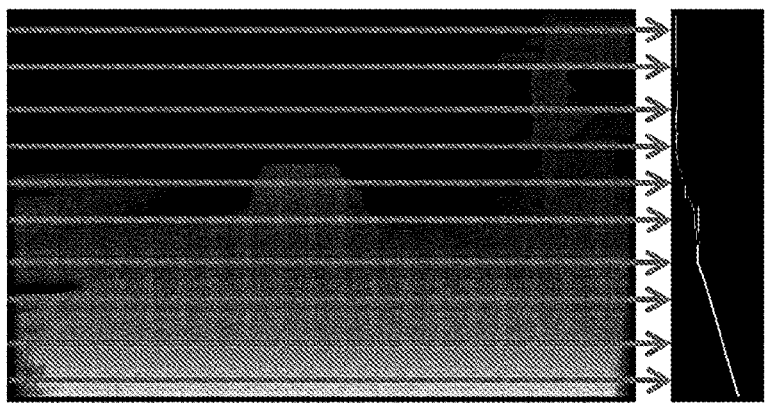
FIGS. 3A and 3B are exemplary diagrams illustrating a process of creating a v-disparity map according to an exemplary embodiment of the present disclosure.

FIGS. 3A and 3B are exemplary diagrams illustrating a process of creating a v-disparity map according to an exemplary embodiment of the present disclosure. FIG. 3A shows a disparity map created in S110. In addition, the v-disparity map as shown in FIG. 3B may be created by accumulating the pixels having the disparity in the disparity map shown in FIG. 3A. In the v-disparity map shown in FIG. 3B, an x axis indicates distance information, and a y axis indicates a value obtained by accumulating values corresponding to corresponding distances. When the v-disparity map is created, a road component may be detected in the v-disparity map (S122). In particular, the road area in the disparity map may appear as a substantially straight line component in the v-disparity map. Therefore, the substantially straight line component in the v-disparity map may be detected as the road component. This will be described with reference to FIGS. 4A to 5B.

Figure 4A:
FIGS. 4A to 5B are exemplary diagrams illustrating a process of detecting a road component in the v-disparity map according to an exemplary embodiment of the present disclosure.
Figure 4B:

FIGS. 4A to 5B are exemplary diagrams illustrating a process of detecting a road component in the v-disparity map according to an exemplary embodiment of the present disclosure. Referring to FIG. 4A, a substantially straight line component is included in the v-disparity map. In addition, as shown in FIG. 4B, the substantially straight line component may be detected as the road component. Meanwhile, the substantially straight line component in the v-disparity map may be detected as the road component under the assumption that a road appearing in the disparity map is one plane. However, when an ascent or a descent is present on the road, when the road is detected as one substantially straight line, an error may occur. Therefore, when the substantially straight line road component in the v-disparity map is detected, a plurality of road components may be detected, thus decreasing the error.

Figure 5A:
Figure 5B:

FIG. 5A shows an exemplary enlarged or detailed image of a partial area of the v-disparity map. The v-disparity map shown in FIG. 5A represents a value that corresponds to the road component. However, in FIG. 5A, the road component does not appear as the straight line component. Therefore, as shown in FIG. 5B, a plurality of road components may be detected when the road component is detected in the v-disparity map. The plurality of road components may be detected in the v-disparity map, thereby making it possible to increase accuracy in detecting the road area. When the road components are detected in the v-disparity map, the road area may be detected in the disparity map (S123). The detected road components may be projected on the disparity map, thereby making it possible to detect the road area.

Figure 6:
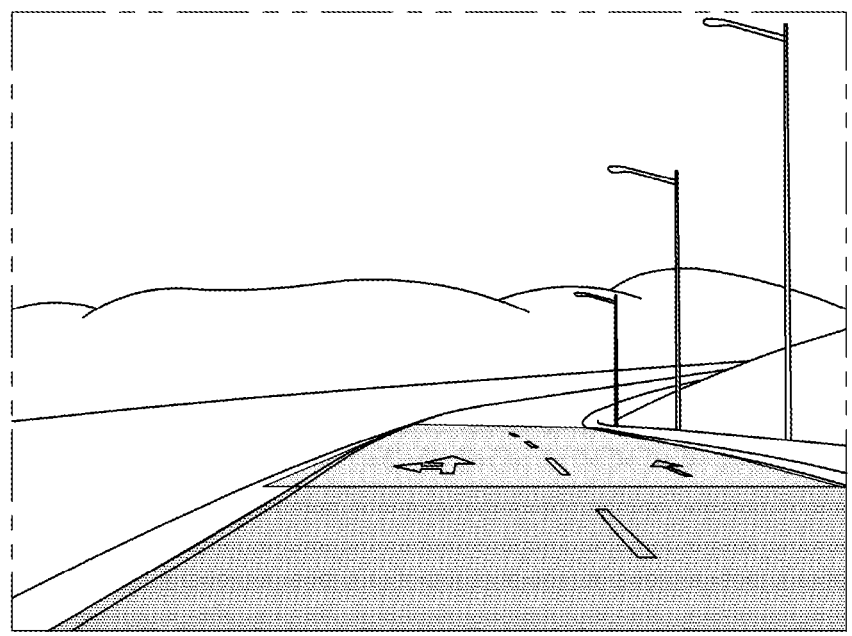
FIG. 6 is an exemplary diagram illustrating road areas detected according to an exemplary embodiment of the present disclosure.

FIG. 6 is an exemplary diagram showing road areas detected according to an exemplary embodiment of the present disclosure. Referring to FIG. 6, road areas corresponding to two road components detected in FIG. 5B are shown, respectively. As seen in FIG. 6, the road areas may be detected using the plurality of road components, to more accurately detect an actual road. Further, in FIG. 6, the detected road areas are shown in a stereoscopic image rather than in the disparity map for convenience of understanding the exemplary embodiment. When the road area is detected, a vehicle present in the road area may be detected in a shape of a stereoscopic object (S130). This will be described in detail with reference to FIGS. 7 to 9E.

Figure 7:
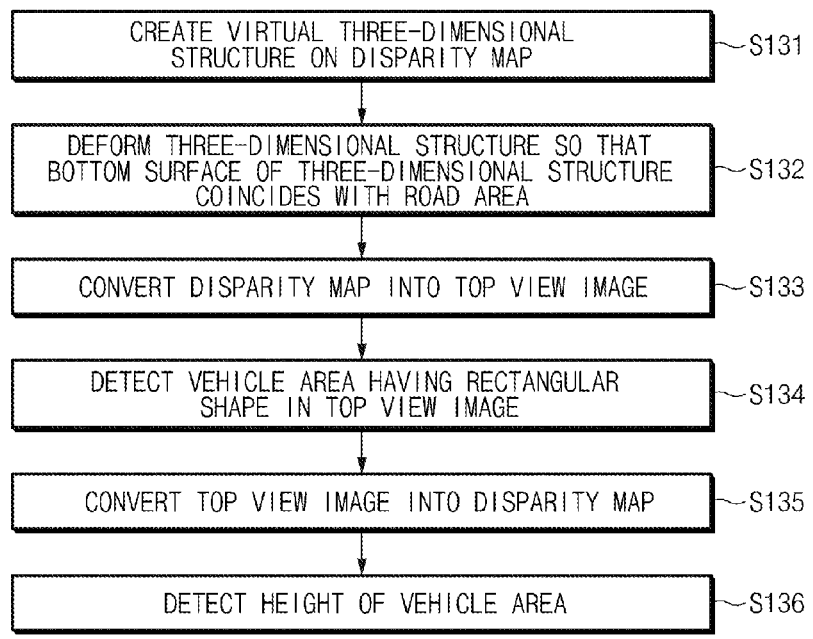
FIG. 7 is an exemplary flow chart illustrating a process of detecting a vehicle present in a road area in a shape of a stereoscopic object according to an exemplary embodiment of the present disclosure.

FIG. 7 is an exemplary flow chart illustrating a process of detecting a vehicle present in a road area in a shape of a stereoscopic object according to an exemplary embodiment of the present disclosure. Referring to FIG. 7, a virtual three-dimensional structure may be created on the disparity map (S131). Then, the three-dimensional structure may be deformed to cause a bottom surface thereof to coincide with the road area (S132). This will be described with reference to FIGS. 8A and 8B.

Figure 8A:
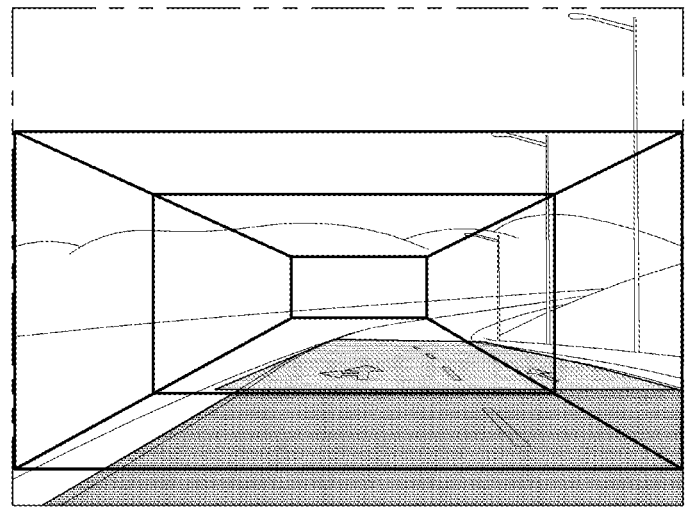
FIGS. 8A and 8B are exemplary diagrams illustrating a three-dimensional structure created according to an exemplary embodiment of the present disclosure.
Figure 8B:
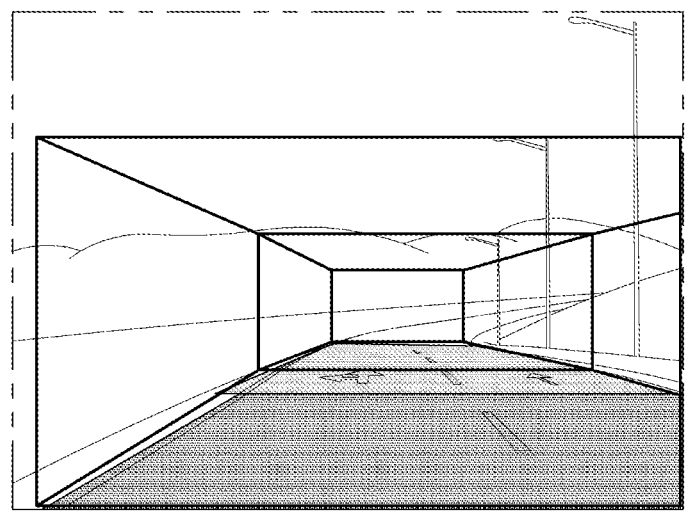

FIGS. 8A and 8B are exemplary diagrams for describing a three-dimensional structure created according to an exemplary embodiment of the present disclosure. When the road area is detected, a three-dimensional structure having a preset shape may be created on the disparity map, as shown in FIG. 8A. The three-dimensional structure shown in FIG. 8A may be shown in a preset shape at a preset position regardless of the detected road. When the three-dimensional structure is created, the three-dimensional structure may be deformed to coincide a bottom surface thereof with the road area, as shown in FIG. 8B. Meanwhile, in FIG. 8, the three-dimensional structure is shown in a stereoscopic image rather than in the disparity map for convenience of understanding the exemplary embodiment.

When the three-dimensional structure is deformed, the vehicle present in the three-dimensional structure may be detected in the shape of the stereoscopic object. A process of detecting the vehicle present in the three-dimensional structure in the shape of the stereoscopic object may correspond to S133 to S136 of FIG. 7. Referring to FIG. 7, the disparity map may be converted into a top view image (S133), and a vehicle area having a rectangular shape may be detected in the top view image (S134). Then, the top view image may be converted into a disparity map (S135) and a height of the vehicle area may be detected using the disparity map. A process of detecting the vehicle present in the three-dimensional structure in the shape of the stereoscopic object will be described with reference to FIGS. 9A to 9E.

Figure 9A:
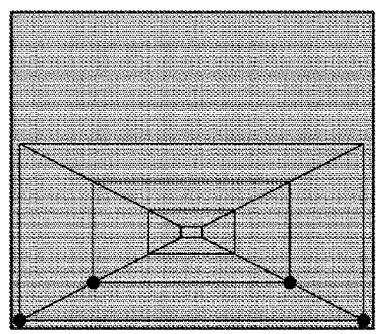
FIGS. 9A to 9E are exemplary diagrams illustrating a process of detecting a vehicle in a shape of a stereoscopic object according to an exemplary embodiment of the present disclosure.
Figure 9B:
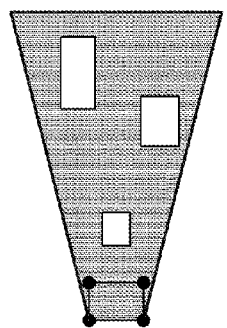

FIGS. 9A to 9E are exemplary diagrams illustrating a process of detecting a vehicle in a shape of a stereoscopic object according to an exemplary embodiment of the present disclosure. FIG. 9A shows an exemplary disparity map in which a three-dimensional structure is created. The disparity map shown in FIG. 9A may be converted into a top view image as shown in FIG. 9B (S133). In particular, perspective projection may be used to convert the disparity map into the top view image. The perspective projection is a process of changing a surface on which an image is projected based on an imaging device view point, and a basic equation thereof is the following Equation 1.

$$\tilde{X}' = P\tilde{X} \qquad \text{Equation 1}$$

$\tilde{X}$: Original pixel coordinate
$\tilde{X}'$: Transform pixel coordinate
P: Projection Matrix Referring to Equation 1, a coordinate $\tilde{X}'$ converted into the top view image may be represented by the product of a specific coordinate $\tilde{X}$ and a matrix P. In addition, Equation 1 may be represented by the following Equation 2.

$$\begin{bmatrix} wx' \\ wy' \\ w \end{bmatrix} = \begin{bmatrix} a & b & c \\ d & e & f \\ g & h & 1 \end{bmatrix} \begin{bmatrix} x \\ y \\ 1 \end{bmatrix} \qquad \text{Equation 2}$$

$x, y$: Original Pixel Coordinate $x'$, $y'$: Transform Pixel Coordinate $a, \ldots, h$: Perspective Transform Parameters In addition, a matrix equation in Equation 2 may be arranged as represented by the following Equation 3.

$$x' = ax + by + c - gxx' - hx'y \qquad \text{Equation 3}$$

$$y' = dx + ey + f - gxy' - hyy'$$

When variables in Equation 3 are arranged in a matrix form, a matrix equation as represented by the following Equation 4 may be obtained.

$$\begin{bmatrix} x'_1 \\ y'_1 \\ x'_2 \\ y'_2 \\ x'_3 \\ y'_3 \\ x'_4 \\ y'_4 \end{bmatrix} = \begin{bmatrix} x_1 & y_1 & 1 & 0 & 0 & 0 & -x_1 x'_1 & -x_1 y'_1 \\ 0 & 0 & 0 & x_1 & y_1 & 1 & -x_1 y'_1 & -y_1 y'_1 \\ x_2 & y_2 & 1 & 0 & 0 & 0 & -x_2 x'_2 & -x_2 y'_2 \\ 0 & 0 & 0 & x_2 & y_2 & 1 & -x_2 y'_2 & -y_2 y'_2 \\ x_3 & y_3 & 1 & 0 & 0 & 0 & -x_3 x'_3 & -x_3 y'_3 \\ 0 & 0 & 0 & x_3 & y_3 & 1 & -x_3 y'_3 & -y_3 y'_3 \\ x_4 & y_4 & 1 & 0 & 0 & 0 & -x_4 x'_4 & -x_4 y'_4 \\ 0 & 0 & 0 & x_4 & y_4 & 1 & -x_4 x'_4 & -y_4 y'_4 \end{bmatrix} \begin{bmatrix} a \\ b \\ c \\ d \\ e \\ f \\ g \\ h \end{bmatrix} \qquad \text{Equation 4}$$

Referring to Equation 4, when four coordinates (x, y) in the disparity map and four coordinates (x', y') in the top view image corresponding thereto are known, eight variables a, b, . . . , h of a matrix P may be obtained. Four coordinates shown in FIG. 9A may be represented by four coordinates shown in FIG. 9B. The matrix P may be obtained using four pairs of coordinates shown in FIGS. 9A and 9B. In addition, when the matrix P is obtained, the disparity map may be converted into the top view image as shown in FIG. 9B. Particularly, since a vehicle may generally be present on the road, a portion that corresponds to an area included in the three-dimensional structure, that is, a road area, may be converted into the top view image to decrease a data throughput.

Figure 9C:
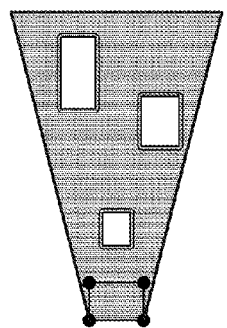

When the disparity map is converted into the top view image, a vehicle area having a substantially rectangular shape may be detected in the top view image, as shown in FIG. 9C. In particular, obstacles having a height equal to or greater than a preset height from the ground among obstacles present in the road area may be detected as the vehicle area. When the vehicle area is detected, a width and a length of the vehicle may be recognized. When the vehicle area is detected in the top view image, the vehicle area may be detected based on the number of pixels occupied by the vehicle depending on a distance from an imaging device to the vehicle. Since the vehicle may be displayed at a smaller size as a distance from the imaging device thereto increases, the number of pixels occupied by the vehicle may be decreased. Therefore, when the vehicle area is detected, an obstacle determined not to be the vehicle may be excluded in consideration of the distance from the imaging device to the vehicle and the number of pixels occupied by the vehicle.

Figure 9D:
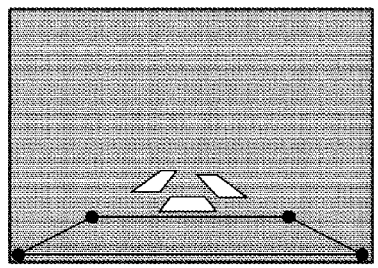
Figure 9E:
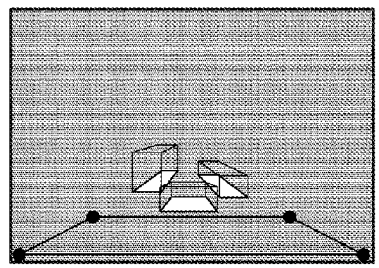

When the vehicle area is detected, the top view image may be again converted into a disparity map, as shown in FIG. 9D. In particular, the top view image may be converted into the disparity map using an inverse matrix P' of the matrix P. Then, a height of the detected vehicle area may be detected in the disparity map, as shown in FIG. 9E (S136). The height of the vehicle area may correspond to a height at which the same depth information is present with respect to the detected vehicle area. When the road area is detected in the disparity map, it may be detected using the plurality of road components, thereby making it possible to more accurately detect the height of the vehicle. Referring to FIG. 9E, it may be appreciated that the vehicle has been detected in the shape of the stereoscopic object in the disparity map. Particularly, as shown in FIG. 9E, the vehicle may be detected in a rectangular parallelepiped shape.

When the vehicle is detected in the shape of the stereoscopic object, the vehicle may be tracked (S140). In other words, the vehicle may be continuously tracked using the shape of the stereoscopic shape detected to be the vehicle. As a method of tracking the vehicle, an optical flow method may be used. However, a three-dimensional optical flow method of using a depth value in the disparity map as a z coordinate as well as x and y coordinates for a stereoscopic image may be used. This will be described in detail with reference to FIGS. 10 to 12.

Figure 10:
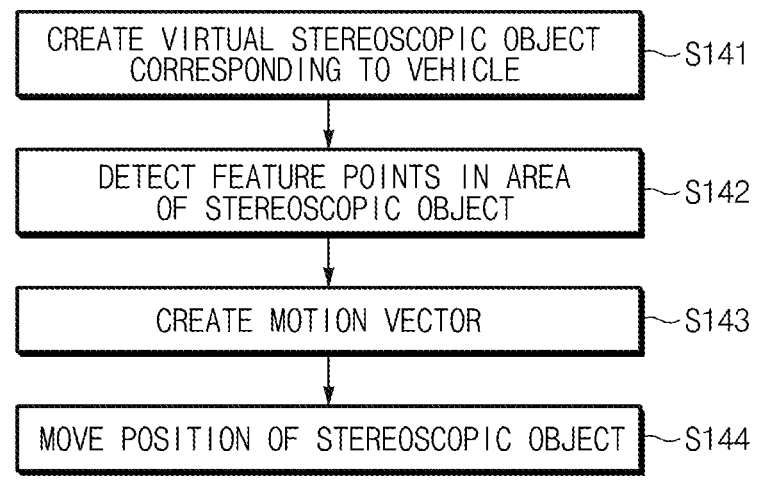
FIG. 10 is an exemplary flow chart illustrating a process of tracking a vehicle according to an exemplary embodiment of the present disclosure.

FIG. 10 is an exemplary flow chart illustrating a process of tracking a vehicle according to an exemplary embodiment of the present disclosure. Referring to FIG. 10, when the vehicle is detected, a virtual stereoscopic object that corresponds to the vehicle may be created on an image photographed by a stereoscopic imaging device (S141).

Figure 11:
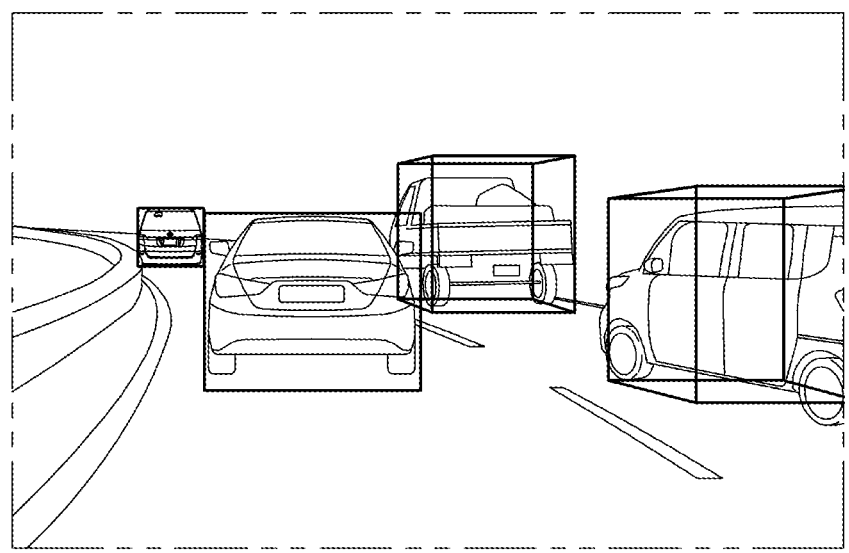
FIG. 11 is an exemplary diagram illustrating an image of a virtual stereoscopic object created according to an exemplary embodiment of the present disclosure.

FIG. 11 is an exemplary diagram showing an image of a virtual stereoscopic object created according to an exemplary embodiment of the present disclosure. Referring to FIG. 11, an area that corresponds to the vehicle is displayed as a stereoscopic object having a substantially rectangular shape on the image photographed by the stereoscopic imaging device. As shown in FIG. 11, the vehicle area may be displayed in a shape of the stereoscopic object, thereby making it possible to more accurately recognize a position of the vehicle compared to when the vehicle area is displayed in a rectangular shape.

When the vehicle area is displayed, feature points may be detected in an area of the stereoscopic object (S142). Referring to FIG. 11, the vehicle area may be displayed in the shape of the stereoscopic object, thereby making it possible to decrease an unnecessary area except for the vehicle while detecting the feature points. Therefore, deterioration of vehicle tracking performance due to erroneous feature point detection may be prevented. In addition, a motion vector may be calculated by comparing feature points detected in temporally continuous images with each other. Particularly, the same feature points among the feature points detected in S142 and the feature points detected in the image temporally continuous thereto may be matched to each other. In addition, a position difference between the matched feature points may be calculated as a vector.

The calculated vector may have an x-axis component, a y-axis component, and a z-axis component. The z-axis component may correspond to a difference between depth values in the disparity map. When a plurality of vectors are created, a final motion vector may be calculated by analyzing directionality of x, y, and z axes of the plurality of vectors and then calculating central values of the x, y, and z axes. In other words, the motion vector may be a vector that indicates a movement amount of the vehicle between continuous images.

Figure 12:
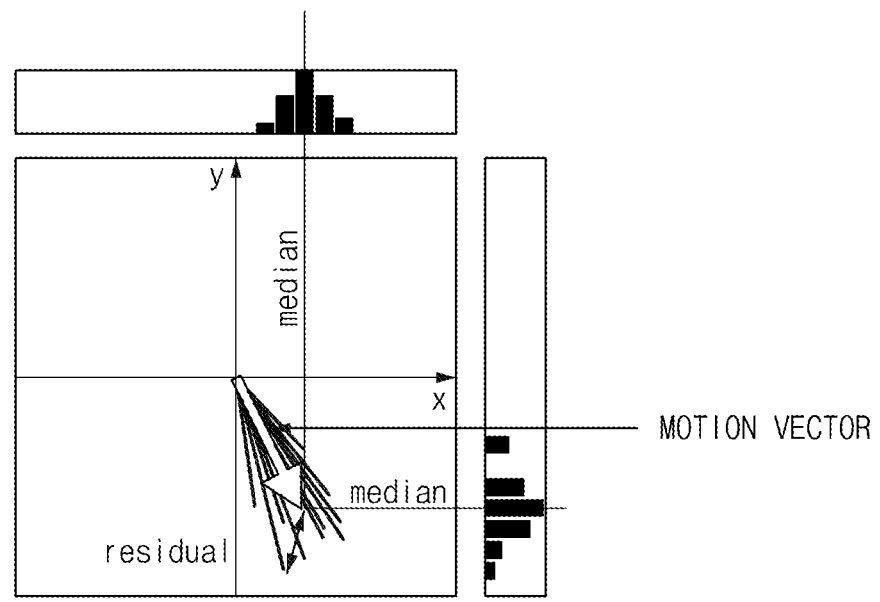
FIG. 12 is an exemplary diagram illustrating a method of calculating a motion vector according to an exemplary embodiment of the present disclosure.

FIG. 12 is an exemplary diagram for describing a method of calculating a motion vector according to an exemplary embodiment of the present disclosure. Referring to FIG. 12, a plurality of vectors are shown in a Cartesian coordinate system. In addition, the respective central values of x-axis, y-axis, and z-axis components of the plurality of vectors may be calculated. Further, a vector represented by the central value of the x-axis components, the central value of the y-axis components, and the central value of the z-axis components may be calculated as the final motion vector. When a plurality of vehicle areas are detected, motion vectors may be calculated with respect to the plurality of vehicle areas, respectively. The detected vehicle may be tracked, thereby making it possible to recognize a current position of the vehicle using tracking for the vehicle detected in the past even when failing to detect the vehicle currently.

Moreover, when tracking the detected vehicle, the above-mentioned vehicle detecting process may not be performed, thereby making it possible to decrease a data throughput. In addition, the vehicle detecting process may be performed at a preset period (for example, a period of 20 frames), thereby making it possible to correct an error that may occur when the tracking process is performed without the vehicle detecting process. According to various exemplary embodiments of the present disclosure, when an obstacle in the vicinity of the vehicle is detected, a data throughput may be decreased, and the vehicle may be detected in the shape of the stereoscopic object, thereby making it possible to more accurately detect a position of the vehicle. In addition, the detected vehicle may be more accurately tracked.

Although exemplary embodiments of the present disclosure have been disclosed for illustrative purposes, those skilled in the art will appreciate that various modifications, additions and substitutions are possible, without departing from the scope and spirit of the present disclosure as disclosed in the accompanying claims. Accordingly, such modifications, additions and substitutions should also be understood to fall within the scope of the present disclosure.

What is claimed is:

1. A vehicle detecting method, comprising:
    creating, by a controller, a disparity map using images photographed by a stereoscopic imaging device;
    detecting, by the controller, a road area on the disparity map;
    detecting, by the controller, a vehicle present in the road area in a shape of a stereoscopic object;
    converting, by the controller, the disparity map into a top view image;
    detecting, by the controller, a vehicle area having a rectangular shape in the top view image;
    converting, by the controller, the top view image into a second disparity map; and
    detecting, by the controller, a height of the vehicle area the second disparity map.

2. The vehicle detecting method according to claim 1, wherein the detection of the road area includes:
    creating, by the controller, a v-disparity map using the disparity map;
    detecting, by the controller, a road component having a straight line form in the v-disparity map; and detecting, by the controller, the road area in the disparity map using the road component.

3. The vehicle detecting method according to claim 2, wherein in the detecting of the road component, a plurality of road components are detected in the v-disparity map.

4. The vehicle detecting method according to claim 1, wherein the detection of the vehicle includes:
creating, by the controller, a virtual three-dimensional structure having a preset shape on the disparity map;
deforming, by the controller, the three-dimensional structure to coincide a bottom surface of the three-dimensional structure with the road area; and
detecting, by the controller, the vehicle present in the deformed three-dimensional structure in the shape of the stereoscopic object.

5. The vehicle detecting method according to claim 1, wherein in the converting of the disparity map into the top view image, an area included in the three-dimensional structure is converted into the top view image.

6. The vehicle detecting method according to claim 1, wherein in the detecting of the vehicle area, obstacles having a height equal to or greater than a preset height among obstacles present in the top view image are detected as the vehicle area.

7. The vehicle detecting method according to claim 1, wherein in the detecting of the vehicle area, the vehicle area is detected in consideration of the number of pixels occupied by the vehicle based on a distance from the imaging device to the vehicle.

8. The vehicle detecting method according to claim 1, further comprising:
creating, by the controller, a virtual stereoscopic object that corresponds to the vehicle in the images photographed by the stereoscopic imaging device;
detecting, by the controller, feature points in an area of the stereoscopic object;
creating, by the controller, a motion vector by comparing the feature points with feature points detected in an image temporally continuous to the image; and
moving, by the controller, a position of the stereoscopic object based on the motion vector.

9. A vehicle detecting system, comprising:
a memory configured to store program instructions; and
a processor configured to execute the program instructions, wherein the program instructions when executed cause the processor to:
create a disparity map using images photographed by a stereoscopic imaging device;
detect a road area on the disparity map;
detect a vehicle present in the road area in a shape of a stereoscopic object;
convert the disparity map into a top view image;
detect a vehicle area having a rectangular shape in the top view image;
convert the top view image into a second disparity map; and
convert a height of the vehicle area using the second disparity map.

10. The vehicle detecting system of claim 9, wherein the program instructions when executed are further configured to:
create a v-disparity map using the disparity map;
detect a road component having a straight line form in the v-disparity map; and
detect the road area in the disparity map using the road component.

11. The vehicle detecting system of claim 10, wherein in the detecting of the road component, a plurality of road components are detected in the v-disparity map.

12. The vehicle detecting system of claim 9, wherein the program instructions when executed are further configured to:
create a virtual three-dimensional structure having a preset shape on the disparity map;
deform the three-dimensional structure to coincide a bottom surface of the three-dimensional structure with the road area; and
detect the vehicle present in the deformed three-dimensional structure in the shape of the stereoscopic object.

13. The vehicle detecting system of claim 12, wherein the program instructions when executed are further configured to:
create a virtual stereoscopic object that corresponds to the vehicle in the images photographed by the stereoscopic imaging device;
detect feature points in an area of the stereoscopic object;
create a motion vector by comparing the feature points with feature points detected in an image temporally continuous to the image; and
move a position of the stereoscopic object based on the motion vector.

14. A non-transitory computer readable medium containing program instructions executed by a controller, the computer readable medium comprising:
program instructions that create a disparity map using images photographed by a stereoscopic imaging device;
program instructions that detect a road area on the disparity map;
program instructions that detect a vehicle present in the road area in a shape of a stereoscopic object;
program instruction that converts the disparity map into a top view image;
program instruction that detects a vehicle area having a rectangular shape in the top view image;
program instructions that convert the top view image into a second disparity map; and
program instructions that convert a height of the vehicle area using the second disparity map.

15. The non-transitory computer readable medium of claim 14, further comprising:
program instructions that create a v-disparity map using the disparity map;
program instructions that detect a road component having a straight line form in the v-disparity map; and
program instructions that detect the road area in the disparity map using the road component.

16. The non-transitory computer readable medium of claim 14, further comprising:
program instructions that create a virtual three-dimensional structure having a preset shape on the disparity map;
program instructions that deform the three-dimensional structure to coincide a bottom surface of the three-dimensional structure with the road area; and
program instructions that detect the vehicle present in the deformed three-dimensional structure in the shape of the stereoscopic object.

17. The non-transitory computer readable medium of claim 14, further comprising:
program instructions that create a virtual stereoscopic object that corresponds to the vehicle in the images photographed by the stereoscopic imaging device;

program instructions that detect feature points in an area of the stereoscopic object;
program instructions that create a motion vector by comparing the feature points with feature points detected in an image temporally continuous to the image; and
program instructions that move a position of the stereoscopic object based on the motion vector.

* * * * *